United States Patent [19]

Vandervelde et al.

[11] Patent Number: 5,281,332

[45] Date of Patent: Jan. 25, 1994

[54] SYSTEM FOR TREATING SEWAGE OR OTHER FLUIDS

[76] Inventors: Don M. Vandervelde, 5409 Huntwick Dr. NW., Gig Harbor, Wash. 98335; Glenn J. Helm, 1616 NE. Dawn Rd., Bremerton, Wash. 98310

[21] Appl. No.: 711,560

[22] Filed: May 30, 1991

Related U.S. Application Data

[63] Continuation of Ser. No. 467,141, Jan. 18, 1990, abandoned.

[51] Int. Cl.$^5$ .................................................. C02F 3/04
[52] U.S. Cl. ..................................... 210/151; 210/170
[58] Field of Search ........................... 210/615–617, 210/747, 150, 151, 170, 252, 261, 265, 283, 290, 311

[56] References Cited

U.S. PATENT DOCUMENTS

| | | | |
|---|---|---|---|
| 3,950,252 | 4/1976 | Jordon et al. | 210/170 |
| 4,162,976 | 7/1979 | Monson | 210/170 |
| 4,211,655 | 7/1980 | Jordon | 210/170 |
| 4,251,359 | 2/1981 | Colwell et al. | 210/170 |
| 4,293,421 | 10/1981 | Green | 210/170 |
| 4,997,568 | 3/1991 | Vandervelde et al. | 210/617 |
| 5,043,061 | 8/1991 | Inagaki | 210/151 |

Primary Examiner—Thomas Wyse

[57] ABSTRACT

A method and device for complete treatment of septic tank effluent or other contaminated water by contriving for it to flow in an ultra-thin film over a surface treatment medium such as fabric or sand. It provides diffusive aeration, biological reaction and physical filtration on a molecular scale.

The device transfers contaminated water, or other liquid, from a container to a final collector completely purifying the liquid in the process. The purified effluent can then be reused for household, industrial, irrigation or other uses, or disposed of as normal surface run-off in streams or lakes.

To increase efficiency, said container encloses a progressively more finely pored media precisely situated with effluent seeping gradually through progressively finer pores to provide uniquely effective pretreatment.

1 Claim, 5 Drawing Sheets

SYSTEM FOR TREATING SEWAGE OR OTHER FLUIDS

This application is a continuation of Ser. No. 07/467,141, filed Jan. 18, 1990, now abandoned.

BACKGROUND OF THE INVENTION

This invention relates to a unique method and device for purification of sewage, wastewater or potable water by thin film aeration and a special prefilter, described in Vandervelde and Helm's U.S. patent application Ser. No. 404894, filed Sep. 8, 1989, now U.S. Pat. No. 4,997,568.

Historically, water purification has taken advantage, in some cases, of aerobic or anaerobic biological devices to produce improved effluent using biota fixed on a substrate, or suspended. Anaerobic devices have traditionally been limited to a maximum of about 70%–80% treatment and proposed as polishing stages prior to some further action, as in E. J. Jordan's (U.S. Pat. Nos. 3,950,252, Apr. 1976 and 4,211,655 Jul. 1980), A. A. Monson's (U.S. Pat. No. 4,162,976 Jul. 1979), and A. W. Green's (U.S. Pat. No. 4,293,421 Oct. 1981).

Sewage and wastewater disposal is becoming a bottleneck in providing housing and employment for an increasing population. As sewage treatment standards become stricter and availability of clean water more restricted, the cost of providing these services rises. The result is people with substandard or unavailable housing and employment in many communities.

Extending and constructing standard municipal sewage plants to accommodate higher population densities is environmentally unsound and becoming cost prohibitive. These systems use poisonous disinfectants, pollute the surface water into which they discharge and prevent normal beneficial recharge of aquifers.

Standard on-site septic systems, to work well, require special soil and groundwater conditions with large lot sizes. These factors are also becoming less available and more expensive as development proceeds. They discharge incompletely treated effluent into the environment.

More exotic and costly on-site septic systems designed to treat sewage under poor soil and groundwater conditions are being used to fill the gap. These include Wisconsin Mound Systems, sand filters and a proliferation of types of mechanical aerobic reactors, many of which use chemical disinfectants that repollute their effluent. These expensive systems do a passable job if designed, installed, and maintained properly. However, they seldom are because of their inherent complexity. This results in discharge of untreated or poorly treated sewage to pollute ground and surface water. Pumps and other mechanical devices that they require are often beyond the owner's financial capability, or interest, to maintain.

Commonly used sand and gravel filters rely on mechanical devices to increase the air/sewage interface by spraying, sparging, or spreading it over sand, gravel, or soil beds. This allows the growth of aerobic biota which treat the sewage. One of the most advanced and effective examples of this type is covered by U.S. Pat. No. 4,251,359, currently merchandised by SPEC Industries.

While investigating ultra-thin water film formation, we found that sewage caused to flow in a film over a hydrophillic surface, such as cotton cloth or sand, left its impurities behind and could then be released by gravity in liquid form into a collector. This resulted in a pooled, pure product free of odor and contamination while freeing the medium surface to adsorb more film.

We believe that further review of patents and literature will not reveal a method or device which can accomplish this treatment as we have. Advantages of this invention are submitted in the Summary.

SUMMARY OF THE INVENTION

This patent combines sui generis use of natural forces to completely purify water by exposing it to a very large hydrophillic solid surface extending up from the contaminated water surface, over the edge of its container and down to a collector at a lower elevation.

An ultra-thin layer of water forms on the surface above the water due to physical intermolecular attraction between the water and the polar substrate, leaving contaminants in the container. Depending on the molecular polarity and effective area of the substrate, this film can rise to a height of at least several inches. If the surface curves horizontally, it advances even further, since attractive forces no longer must overcome gravity. If it then turns downward, the film flows with increased velocity, indefinitely, with the assistance of gravity. At the lower, distal end of the surface, still with the aid of gravity, the film can coalesce and pool to drip or run off the surface into the collector.

The film on the above-described inverted U-shaped surface acts as a nearly perfect elastomer. If the weight of the film on the downward flowing leg of the inverted "U" running to the collector is greater than the weight of the connected film on the upward flowing leg rising from the contaminated water, it will create upward elastomeric tension and stretching of the film on the upward leg with a force overcoming gravity, thus drawing the film up and over the top of the inverted "U" onto the downward leg and down to the collector to be released by gravity into it.

This process continues automatically, transferring purified water to the collector at a velocity dependent on the difference in weight of the upward and downward legs of the film. Velocity will slow, then stop, as the container empties. As the stretched film flows over the surface, energy is lost to friction so that the distance of travel, or, the total length of the inverted "U" limits the velocity of flow.

A greater medium effective surface area holds a greater volume of flowing film for a greater total flow rate at any given velocity. A larger medium pore size has a greater ambient air diffusion and convection rate for more effective aeration and/or evaporation. While we believe the physical principles are as taught above, we don't want to be bound by this.

Water produced from sewage by this invention has undetectable levels sewage contamination parameters including odor, micro-organisms, biological oxygen demand and suspended solids. The purified product can then be disposed of without concern for human contact or environmental pollution. It can be reused for household, industrial or irrigation purposes or, discharged safely as normal surface precipitation run-off into storm sewers, ditches, streams or lakes. No separation or setback distances need be provided from wells, surface water, buildings or property lines, nor does it need particular soil or groundwater conditions, as do standard systems.

Operation of this invention is cost free, requiring no outside power, energy, mechanical devices, nor regular maintenance. Relying on natural forces for operation, it will go indefinitely without attention. If, under unusual circumstances, maintenance should be required, it can easily be back-flushed, repaired, or replaced.

This device can work well alone, but the preferred embodiment uses a particular type of physical filter-biological reactor as the container. This container may be a cylinder, wedge or cone shape with the contaminated water introduced at the center or apex from which it seeps gradually through layers of saturated porous media toward the periphery. The first medium layer at the center or apex is coarse with large pores. The water is pretreated here by settling, flotation, physical filtration, composting and fixed film and suspended biological reaction enough to be further treated in the following layer containing a finer pored medium without plugging by biological growth. The water is similarly treated in this second layer sufficiently to prevent plugging in the third layer with even finer pores, and so on. Each progressively finer layer has more surface layer, smaller pores, smaller iterstitial distance and more efficient treatment, until the desired level of treatment is reached.

From the final, the finest layer the film-forming medium surface rises above the saturated level to provide the final complete treatment described above.

Material for constructing these devices is common and inexpensive, consisting of: the surface medium which may be well graded soil, sand or gravel; the container which may be a geomembrane over sculpted earth, or sculpted clay, or other soil with fine enough particle size to prevent the escape of untreated effluent. If reuse or direction to disposal of effluent is wanted, a collector and associated plumbing may be needed which could be a trough with pipe and fittings. If only disposal is wanted and there is sufficient unsaturated soil surrounding the apparatus, the substrate for the thin film can be extended over the edge of the container into contact with the unsaturated soil to continue down to natural ground water or impermeable native soil layer.

Location of this invention is compatible with all types of construction. It may be in or under buildings, parking areas, or used for normal lawn, garden or agriculture, requiring no irrigation.

The device can be used to purify, concentrate, evaporate or aerate liquids or suspensions, or as an automatic self-starting nonpowered pump requiring only slight hydrostatic head to start and drive it. It can be used with aqueous or nonaqueous fluids and a range of hydrophillic to hydrophobic surface substrates.

The container and collector can be made of any stable impermeable material such as metal or plastic. The medium could be any granular, porous, woven, or layered material such as metal, mineral, plastic, fabric, or open celled foam plastic, metal or glass.

Tubing can communicate from various regions in the saturated pretreatment area to the surface, to transfer gasses or sample effluent.

DETAILED DESCRIPTION OF THE DRAWINGS

Figure 1:
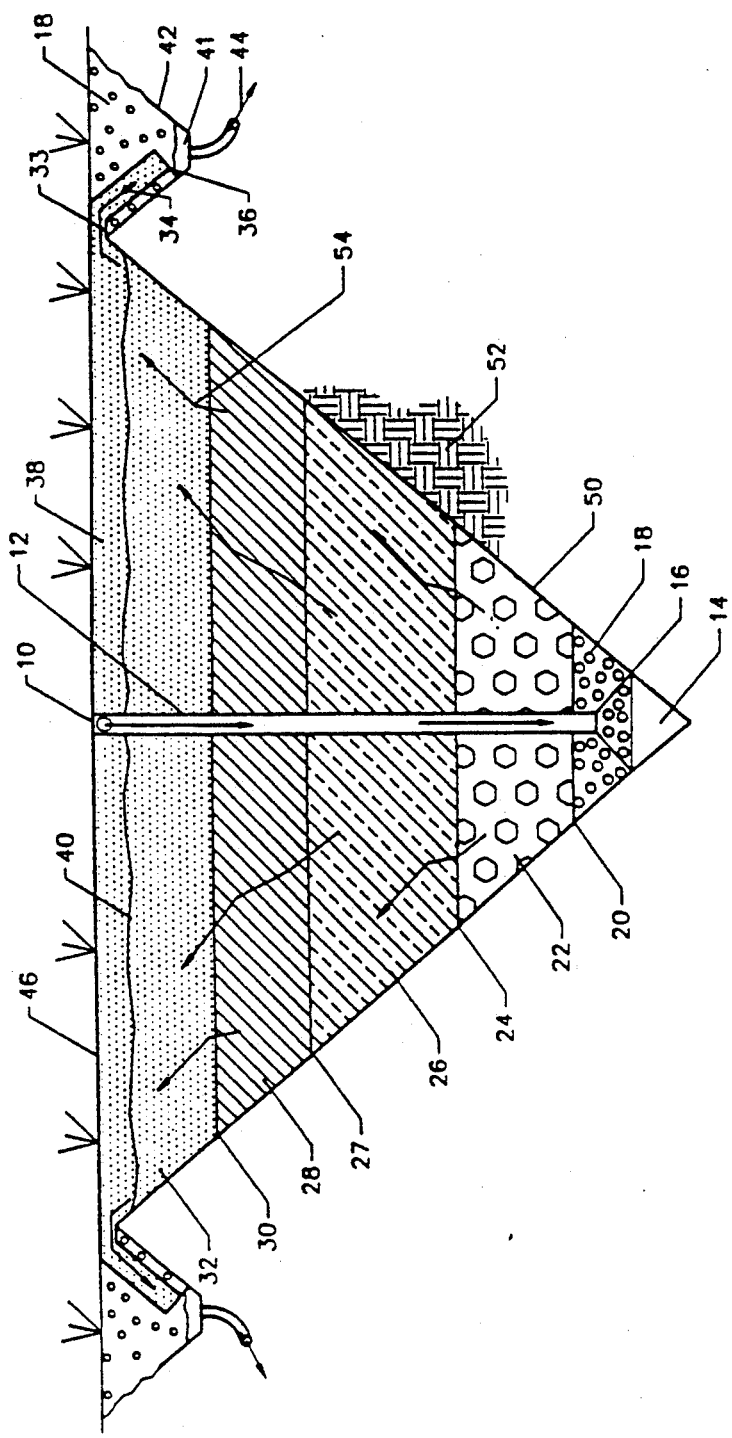
FIG. 1. Side section of cone or vertical wedge shaped container with sand film surface rising up over the edge and down to collector.

In FIG. 1., sewage, septic tank effluent or other liquid to be processed flows into inlet (10) moving by slight hydrostatic force down the pipe (12) to the settling chamber (14) at the bottom, then through the perforated plate separator (16) into the coarse medium (18), in this case $2\frac{1}{2}'' \times 1\frac{1}{2}''$ well washed drain rock, where further settling, physical filtration, composting, suspended and fixed film biological reaction treat to the extent that it can seep through a screen separator (20) with pore size similar to the finer medium, into the next finer layer (22), in this example $\frac{5}{8}'' \times \frac{3}{8}''$ well washed gravel where further similar treatment takes place allowing it to flow similarly through the next separator (24) into the next finer medium (26), in this case well washed sand with effective particle size $<0.80$–$2.00$ mm and a uniformity coefficient $<1.5$, without clogging, then similarly through a fabric separator (27) into a still finer medium (28) in this example, washed sand with an effective particle size $-0.50$–$0.60$ mm and uniformity coefficient of $<1.6$. Then it seeps through a fabric separator (30) into a film forming layer (32) in this case, of coarse to medium sand which extends over the edge of the container (33) to form the downward leg (34). The downward leg is enclosed in separator fabric (36) and supported on, and embedded in, drain rock (18) to protect it and admit ambient air.

The pretreated effluent forms a film on the upper unsaturated layer of sand (38), above the upper level of saturation (40), which is drawn laterally up over the edge (33) and onto the downward leg (34) to coalesce as free liquid at its lower tip which then pools (41) in the collector (42) to run out the outlet (44) to storage for reuse. Ambient air convects and diffuses from ground level (46) through the interstices to aerate the film. The container (48) and collector (42) in this example, are made of plastic geomembrane (50) supported by native soil (52). Arrows (54) indicate direction of water flow. Verticle tubes (56) for gas transport or effluent sampling in lower layers.

Figure 2:
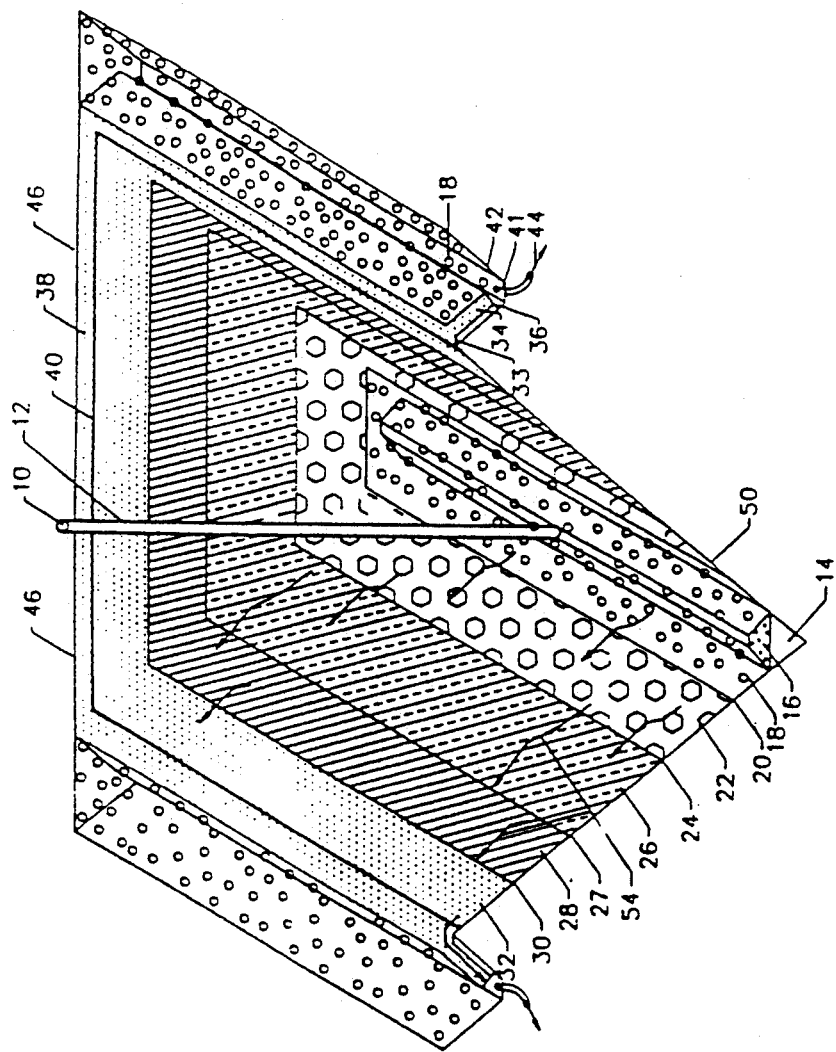
FIG. 2. Top, see-through, view of vertical wedge shaped container of indeterminate length with sand film surface running along two opposite sides.

In FIG. 2., sewage, septic tank effluent or other fluid to be processed flows in inlet (10), down under slight hydrosatic pressure to the apex, through the perforated influent distribution pipe (11) that runs the length of the container (46) then upward and outward through the pretreating layers indicated by lines showing intersections with geomembrane (13), as in FIG. 1., forming a thin film at the upper level of saturation (40) which flows outward and upward on the upper layers of unsaturated sand over the container edge (33) and down the downward leg (34) coalescing in the collector (42) buried in drain rock (18) to protect it and admit ambient air. Then it pools (41) to run out the outlet (44) to storage for reuse.

Figure 3:
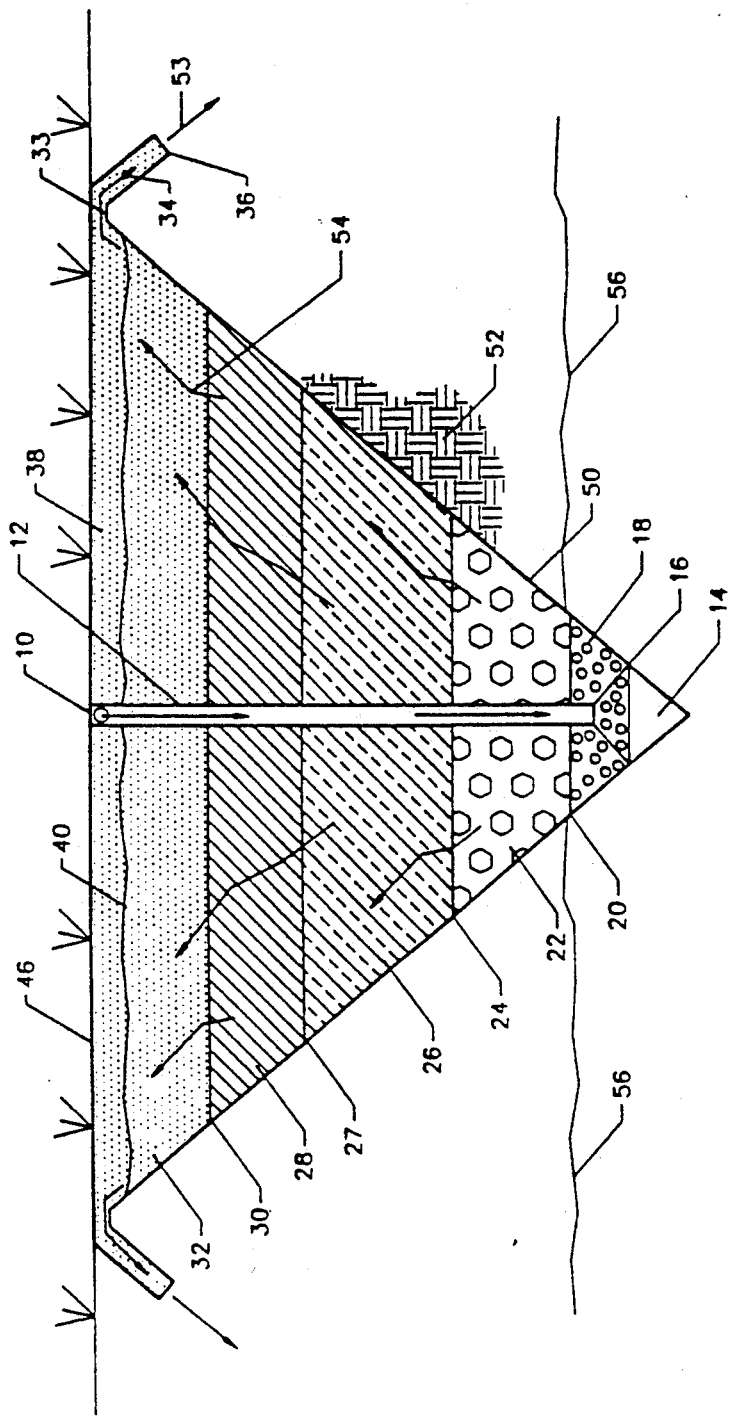
FIG. 3. Side section of cone or verticle wedge shape container with sand film surface flowing to unsaturated soil to join the local water table.

In FIG. 3., the principle is the same as FIG. 1., except that the purified effluent film (53) is guided to join local ground water (56) for disposal, not saved for reuse.

Figure 4:
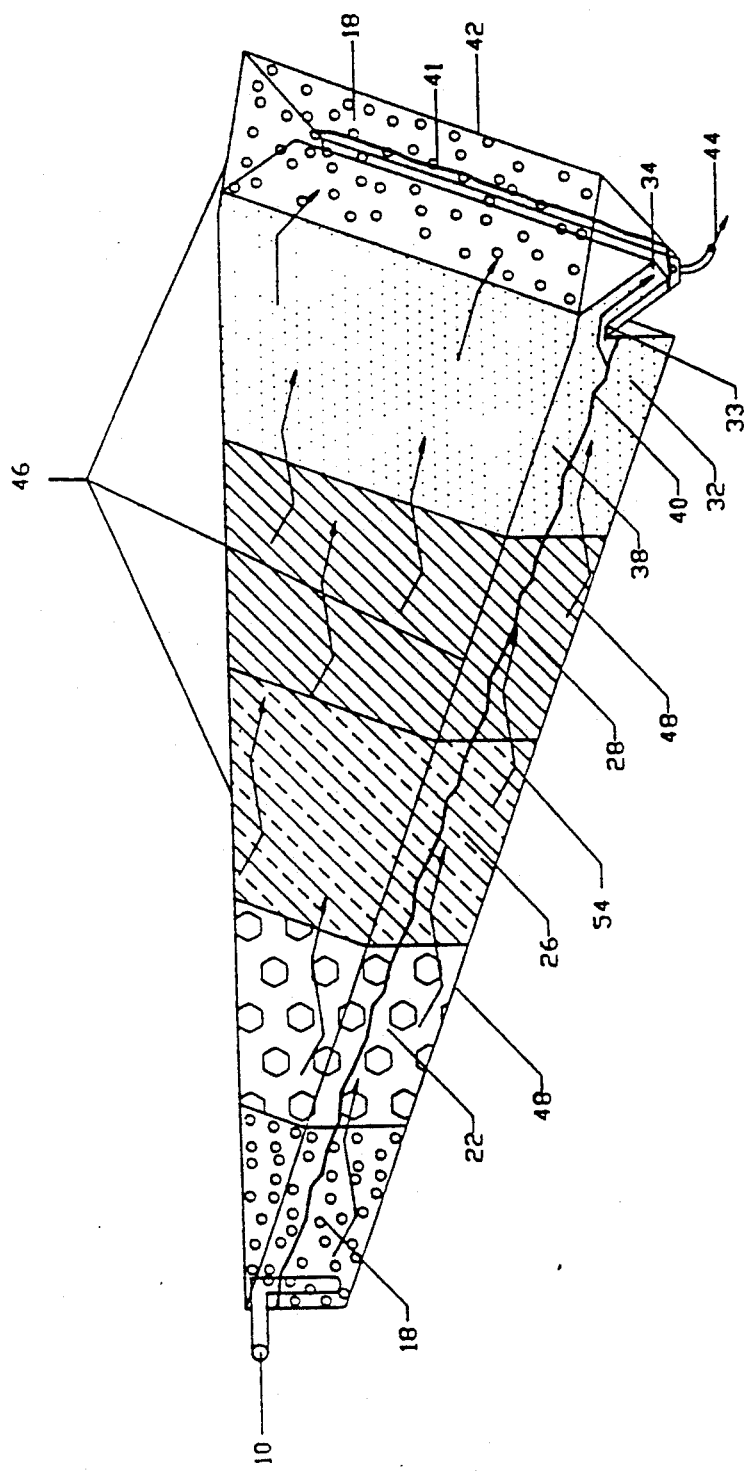
FIG. 4. Perspective view of horizontal wedge shape container with sand film surface over peripheral edge.

In FIG. 4., the fluid to be processed flows horizontally through the treatment layers laid out in a horizontal wedge or pie-shape container (48) with extra air exposure at the top of each layer. It forms a film that flows over the peripheral edge (33) then through the downward leg (34) as in previous figures.

Figure 5:
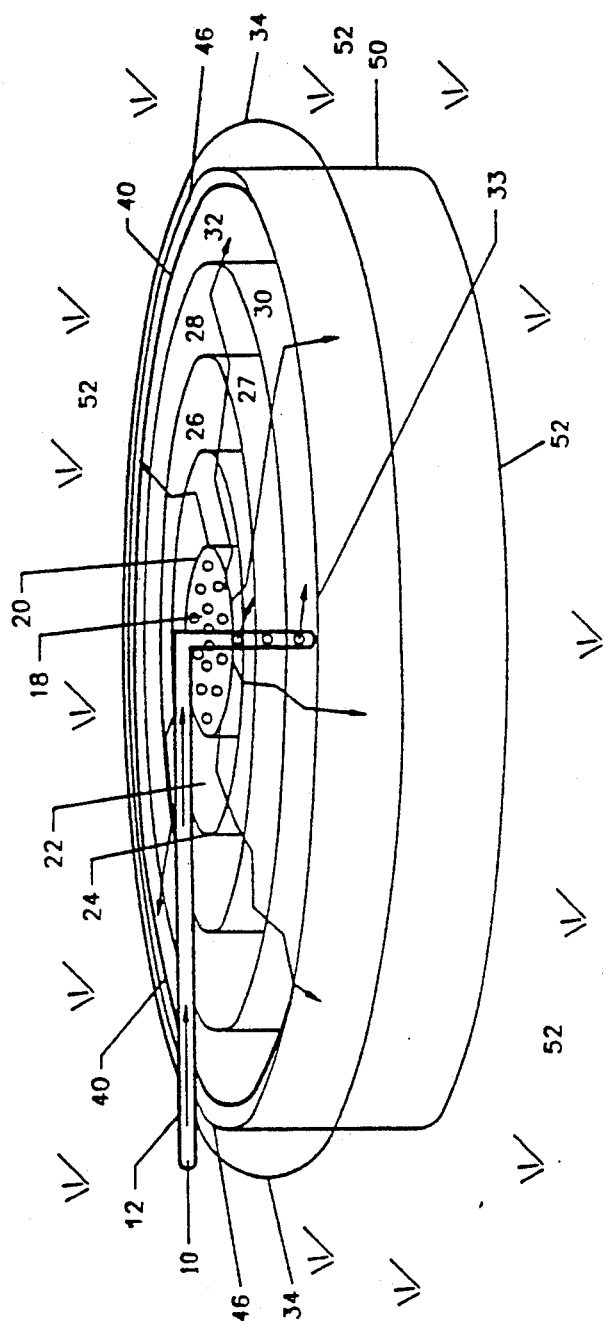
FIG. 5. Perspective view of cylinder shape with effluent going to local ground water.

In FIG. 5., the inlet is at the center of a cylinder to flow radially and axially over the peripheral edge onto the downward, thence as FIGS. 1, 2, 3, and 4.

Although particular preferred embodiments of the invention are herein disclosed for illustrative purposes, it is to be understood that all variations lying within the scope of these claims are contemplated.

We claim:

1. An apparatus for the treatment of waste water comprising:
   (a) an open-topped water tight container for receiving and holding the waste water to be treated; said container having a rim and further comprising:
      (i) a filter arranged inside of the container; said filter comprising a plurality of layers of granular or porous filter medium, and having a starting layer of relatively course medium with large pores serving as an initial treating layer; a next layer of finer medium with more surface area per unit of volume and smaller pores; and each successive layer filter medium being respectively finer with more surface area and smaller pores than the previous layer;
      (ii) a passageway for receiving the waste water to be treated and for discharging the waste water into the starting layer of the filter for distribution through the successive layers of filter medium;
   (b) a shapeable medium having hydrophilic surfaces and having an inverted U cross section; said shapeable medium being arranged over the rim of said container with two depending legs of different lengths; the shorter leg of the shapeable medium reaching to the top of the uppermost layer of filter medium in the container, and the longer leg of the shapeable medium reaching to a discharge locale outside of the container; said discharge locale being located at a level which is below the top of the uppermost layer of filter medium inside of the container; whereby the shapeable medium supports and guides a flow of film of the waste water from the filter to the discharge locale, while this film of waste water is simultaneously purified by biological and physical treatments; and
   (c) a collector for treated liquid, located at the discharge locale, which receives the film of treated liquid from the shapeable medium.

* * * * *